July 12, 1966  R. E. RAYMOND  3,260,501
FOUR QUADRANT BALANCING DESIGN FOR VALVES
Filed May 9, 1962  2 Sheets-Sheet 1

INVENTOR.
ROBERT E. RAYMOND
BY *Schmieding and Fultz*
ATTORNEYS

July 12, 1966   R. E. RAYMOND   3,260,501
FOUR QUADRANT BALANCING DESIGN FOR VALVES
Filed May 9, 1962   2 Sheets-Sheet 2
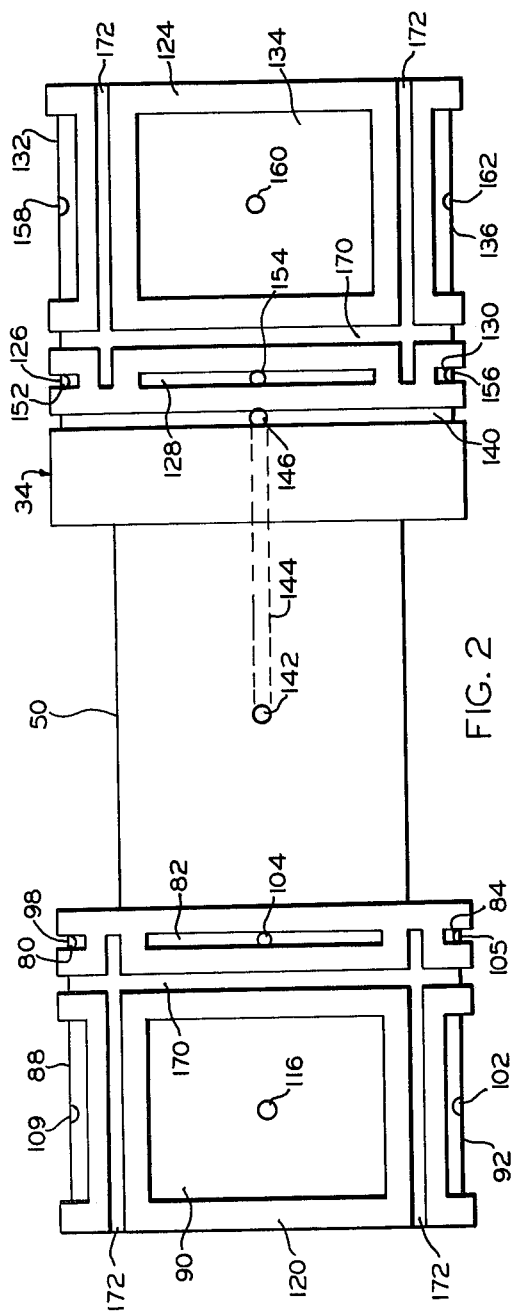
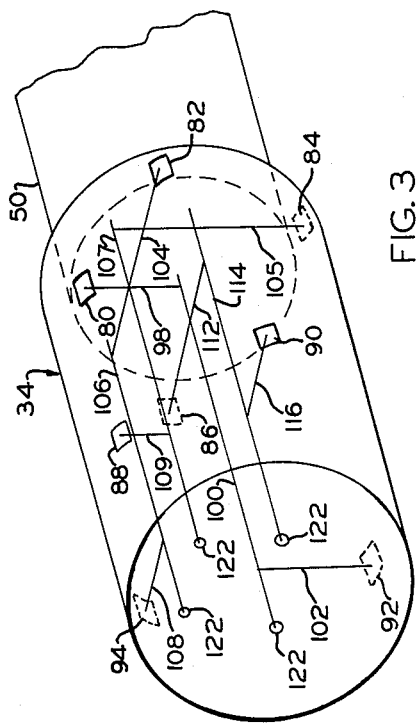
INVENTOR.
ROBERT E. RAYMOND
BY *Schmieding and Fultz*
ATTORNEYS 3,260,501
FOUR QUADRANT BALANCING DESIGN FOR VALVES
Robert E. Raymond, Zanesville, Ohio, assignor, by mesne assignments, to International Basic Economy Corporation, New York, N.Y., a corporation of New York
Filed May 9, 1962, Ser. No. 193,459
4 Claims. (Cl. 251—282)

This invention relates to hydraulic apparatus and particularly to a novel pressure balanced construction for spool valves, pintles, and the like.

The most fundamental and basic problem associated with operation of a spool valve or pintle is the inherent gradient induced locking forces that develop because of leakage flows across sealing land areas. From experience, it appears that no matter whether the sealings lands are short, long, or split up into a series of sealing lands by concentric rings, the basic locking forces still exist. Apparently, with long sealing lands, there is more tendency to get higher locking forces than with shorter sealing lands where the gradient is more symmetrical. This situation is caused by the basic fact that a spool valve, no matter with what precision it is fit into its sleeve, has many imperfections axially extending along the sealing surface. These imperfections are in the form of taper, out of roundness, and minute leakage passages which at random may occur across any and all of the surfaces. There is no way to eliminate these imperfections short of actually finishing spools and bores to micro-finishes and micro-tolerances. Since the normal errors in manufacturing tolerances are in a significant proportion to the actual design tolerances that should theoretically be held, the errors can be from 100% to 200% of what the variable is at a control condition.

Complicating this general manufacturing problem of sealing surfaces is the inherent tendency for spool valves to have a silting condition in the close clearances due to leakage fluid carrying micronic particles. As these particles build up between the sealing surface clearances they create in themselves pressure gradient differences over the spool sealing surfaces.

Fundamentally, a spool as it is inserted into the round bore of its housing is basically unstable in the sense that it is not necessarily going to be centered unless it is externally moved at some velocity where journal bearing films will develop on all sides of the spool and tend to position the spool because of velocity or journal film wedge action which tends to give a centering action on the spool. This occurs if the spool is rotated or moved longitudinally at a certain frequency. This is also borne out by experiment and what is known in the hydraulic art as "dither" which seems to prevent spool locking conditions from developing.

The main and most serious problem of spool locking occurs after an appreciable amount of time has passed with the spool in a set position under large hydraulic gradient conditions. Under these conditions the spool is apparently unstable and will move in one direction or another depending upon the random gradient conditions so that it becomes eccentric in the bore. Finally, the film lubrication breaks down and metallic contact is developed that induces very high friction forces which must be overcome to break loose the spool. These forces depend upon the gradient conditions and the particular configuration and tolerances involved in the spool and bore design.

Even though the locking conditions are a function of pressure gradient and spool geometry, there is a very definite universal tendency for all spools to behave in a similar manner. This indicates that no fundamental anti-locking method has yet been developed or is likely to by chance result from a particular spool design.

In accordance with the present invention the spool valve and pintle structures incorporate multiple quadrant balancing wherein the spool is provided with large counterbalancing areas or pressure pads arranged in circumferentially spaced relationship so that controlled forces for centering the spool are exerted in all directions rather than in any one set pattern.

The above mentioned quadrant balancing pads are fed with leakage fluid by respective diametrically opposed detector slots. These detector slots are thin recesses arranged on the spool periphery in spaced multiple quadrant relationship. These slots function to detect the eccentricity of the spool relative to its bore and are also arranged to send appropriate signals to the pressure pads to correct spool position automatically and force the spool to center itself.

It is, therefore, an object of the present invention to provide an improved spool valve or pintle assembly that incorporates a novel multiple quadrant balancing construction which automatically centers the spool or pintle in its bore and thereby eliminates unequal hydraulic force gradients whereby sticking and high resistance to movement are eliminated.

It is another object of the present invention to provide a balanced spool or pintle of the type described that utilizes the pressure of hydraulic fluid being controlled to center and balance the spool or pintle in its bore.

It is still another object of the present invention to provide a hydraulically balanced construction for a spool valve or pintle assembly which can utilize an auxiliary control flow of fluid brought into the apparatus from an outside source to balance the device at various selected pressures that may be higher or lower than the pressure of the fluid being controlled by the apparatus.

It is another object of the present invention to provide a multiple quadrant balancing construction for pintles of the type used with rotors of pumps or motors which construction can be utilized to reduce bending moments and unbalanced loads which may be externally imposed on devices of this nature.

In the drawings:

FIG. 2 is a side elevational view of a spool incorporated in the valve mechanism of FIG. 1; and FIG. 3 is a diagrammatic view showing the arrangement of passages through the spool of FIG. 2.

Figure 1:
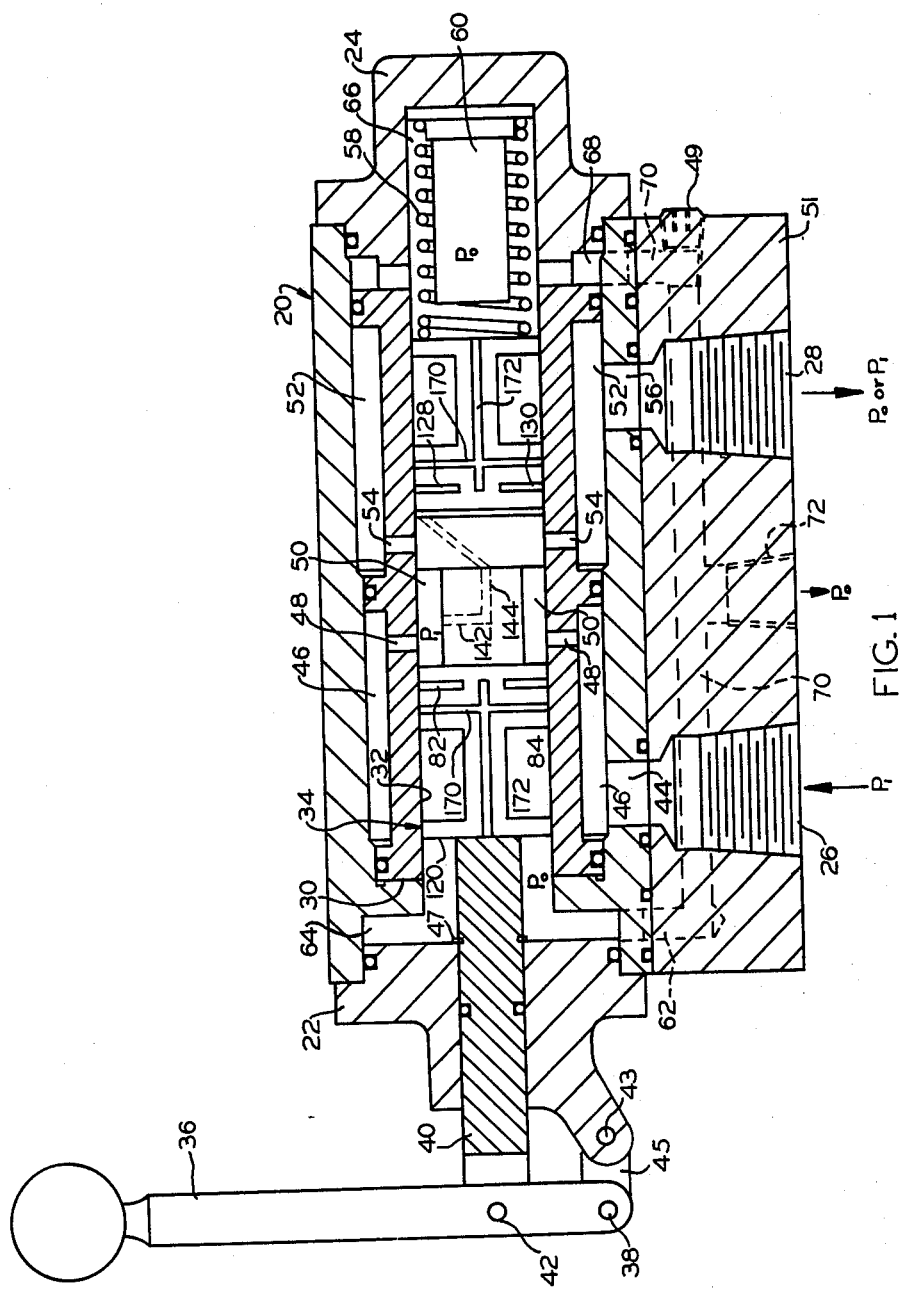
FIG. 1 is a side sectional view of a typical spool valve mechanism constructed in accordance with the present invention, the section being taken along a vertical plane through the center line of the valve.

Referring in detail to the drawings, FIG. 1 illustrates a typical two-way spool valve mechanism constructed in accordance with the present invention which includes a housing 20 provided with end caps 22 and 24 and a subplate mount 25 mounted in sealed relationship with housing 20. The sub-plate is provided with an intake port 26 and an outlet port 28 threaded for conventional line fittings.

Housing 20 contains a cylinder member 30 provided with a central bore 32 in which is shiftably mounted a spool indicated generally at 34 in FIG. 1 and shown in enlarged detail in FIG. 2.

Spool 34 is shifted from the normal flow blocking position of FIG. 1 by means of a lever 36 pivoted to end plate 22 at a pivot 38 and which is connected to a spool actuating rod 40 at a pivot 42. A link 45 connects an end pivot 38 of the lever with end plate 22 at a pivot pin 43.

When the spool is shifted to the right, as viewed in FIG. 1, inlet port 26 is connected with outlet port 28 and fluid flows via passage 44, annular passage 46, radial passages 48, annular passage 52, radial passages 54, and passage 56 leading to outlet port 28.

The spool is returned to the left or shut-off position illustrated in FIG. 1 by a compression spring interposed between the right end of spool 34 and end cap 24, a spring retainer being provided at 60.

Reference is next made to FIG. 2 which illustrates spool 42 and the specific construction thereof that provides the multiple quadrant hydraulic balancing features of the present invention.

In this particular application a spool neck portion 50 is constantly subjected to line pressure entering at inlet port 26 via the passages previously described, and the right and left ends of the spool confront low pressure or tank chambers 64 and 66 which are constantly subjected to tank pressures via passages 66, 68, 70, and outlet port 72 leading to a reservoir not illustrated.

In view of the above, it will be understood that two oppositely decreasing pressure gradients will at all times exist axially along the spool. One pressure gradient occurs between spool neck 50 and left tank chamber 64 and the other pressure gradient occurs axially along the spool between spool neck 50 and right tank chamber 66. In other words, there is a pressure drop of from $P_1$ to $P_0$ from neck 50 to left tank chamber 64 and also a pressure drop of $P_1$ to $P_0$ from neck 50 to right tank chamber 66.

Reference is next made to FIGS. 2 and 3 which illustrate in detail the construction of spool 34 and the various passages therein that connect the various detector slots with respective diametrically opposed pressure pads.

As seen in FIG. 2, spool 34 includes four detector openings or slots 80, 82, 84, and 86, FIG. 3, three of these appearing in the side view of FIG. 2.

These detector slots each feeds a respective one of a plurality of pressure pads or recesses 88, 90, 92, and 94, three of which are seen in FIG. 2.

As is best seen in FIG. 3 detector slot 80 is connected to pressure pad 90 via drilled passages 98, 100, and 102; detector slot 82 is connected to pressure pad 94 via passages 104, 106, and 108; detector slot 84 is connected to pressure pad 88 via passages 105, 107, and 109 and detector slot 86 is connected to pressure pad 90 via passages 112, 114, and 116.

It should be pointed out that the longitudinal passages 100, 106, 107, and 114, are drilled into the left end 120 of the spool and provided with plugs 112 as seen in FIG. 3.

The passage arrangement for right side 124 of spool 34 is a mirror image of that shown for the left spool end 120 in the diagrammatic view of FIG. 3. For example, the right side is provided with a plurality of detector slots, three of which are seen at 126, 128, and 130 in the side view of FIG. 2, these detector slots being respectively connected to diametrically opposed pressure pads, three of which are seen at 132, 134, and 136 in FIG. 2.

The right side 124 of spool 34 differs from the left end 120 in that it is provided with a pressure feed ring 140 for evenly distributing leakage fluid to detector slots 126, 128, 130, as well as the detector slot on the far side of the spool which is hidden from view in FIG. 2.

Pressure feed ring 140 receives leakage fluid from the high pressure chamber 50, FIG. 1, formed by neck 50 of the spool, via a radial passage 142, a longitudinal port 144, and a radial passage 146.

The inclusion of a pressure feed ring, such as recess 140, is not essential to the basic operation and may, if desired, be included or omitted at either or both sides of spool neck 50.

It should be pointed out that longitudinal passage 144 is drilled in from the right end 124 of the spool and is closed by a threaded plug, not illustrated.

Although a diagrammatic view of the passage arrangement for right side 124 of the spool 34 is not included in FIG. 3, since it is a mere image of the passage arrangement for the left end, nevertheless some of the passage inlets for the detector slots may be seen at 152, 154, and 156, FIG. 2, and some of the passage outlets for the pressure pads appear at 158, 160, and 162.

With continued reference to FIGS. 1 and 2, the various pressure pads and detector slots are pressure insulated from one another by shielding openings or slots in the form of annular recesses 170 and longitudinally extending recesses 172. All of these recesses drain to one or the other of the tank chambers 64 or 66, FIG. 1, and provide short circuits back to tank for preventing high pressure interleakage between the detector slots and pressure pads.

In operation, the end chambers 64 and 66 of the spool are drained to tank from the neck 50 of the spool that is constantly pressurized at $P_1$. The downstream pressure at the tank chambers 64 and 66 at the spool end is tank pressure or $P_0$. There exists a pressure gradient from $P_0$ to tank across the lands which gives rise to gradient forces.

The pressure $P_1$ is fed into the detector slots 82–86 on the left side of neck 50 and into pressure feed ring 140 on the right side of the neck. Hence pressure $P_1$ is used as a feed pressure for the detector slots and balancing pads connected thereto. The function of the detector slots is to receive increased leakage flow from the spool neck 50 and pressure feed ring 140 if the spool moves in such a direction as to open up the leakage path between the feed source $P_1$ and certain of the detector slots. Obviously, if the spool moves to one side, the detector slots on that side of the spool will receive more fluid or leakage rate while the detector slots on the opposite side of the spool are reducing their absorption of leakage fluid from the source $P_1$.

The detector slots on one side of the spool are directly connected to respective quadrant balancing pads on opposite sides of the spool whereby increased leakage to the detector slots on one side of the spool generates a larger restoring force in the balancing pads on the opposite side of the spool. This results in automatic position restoring compensation produced by large forces in the balancing pads. Conversely, the detector slots on the far side of the spool are simultaneously closed down due to spool movement in that direction. Opposite balancing pads are opened up by the same movement. Therefore, the mechanical movement of the spool is in all cases in the proper direction to give force or reduce force to the balancing pads, as the case may require.

The shielding rings 170 and shielding slots 172 are required to isolate the above described interacting functions since detector slots cannot be allowed to feed signals into balancing pads on the same side of the spool. Therefore, they must be shielded or grounded to the shielding rings and slots so that leakage fluid from the detector slots to the adjacent balancing pad on the same side of the spool cannot occur. This is also true of opposite direction leakage from the balancing pad to the detector slot, which cannot occur.

The shielding slots 172 are extended also between adjacent detector slots so that leakage cannot occur to overdrive from one detector slot to another in an adjacent quadrant. The only leakage flow that is significant as far as the detector slot is concerned comes from the spool neck or pressure feed ring in an axial direction. The shielding slots 172 also isolate adjacent balancing pads so that fluid cannot leak from one balancing pad to the adjacent balancing pad in the next quadrant. Such leakage would of course cause interaction and overdriving which would void the basic centering action of the detector slot and pressure pad arrangement.

The basic advantage of the present balancing arrangements results from the elimination of interaction possibilities between balancing slots or balancing grooves on the spool. Large areas or balancing slots, no matter what the intent, cannot be located close to each other and still have one particular slot operate a balancing pad without proper shielding. Moreover, the imperfections in manufacturing at the required close clearances will not permit one to estimate or calculate accurately leakage flows across close clearances and be assured that these can be calibrated to such an extent that they will perform properly. Fundamentally, the solution must actually be a closed-loop feedback system which operates independently of manufacturing tolerances or calculated calibrated factors.

It should be pointed out that there can be no external deflection imposed upon the sleeve and spool assembly. In other words, the sleeve cannot deflect in such a manner under pending moments that would cause the spool to bind for, in this case, balancing pad procedures would be of little value. By strategically arranging the balancing pads for the least bending moment on the spool, one can be assured of the fact that excessive deflection of the spool will not occur and the spool will be truly balanced by linear force balance as well as bending moment balance.

It should be pointed out that the present drawings illustrate a rather general solution to the problem, emphasizing the basic features that are required. In the first place, a source of pressure is required for the detector slots. It need not be the primary pressure $P_1$ but can be an auxiliary pressure brought in from the outside of housing 20 at a much lower or higher level as the case may require. In addition to this, this pressure can be brought in thru an additional collector slot or slots if these are properly arranged mechanically in the valve. Also, the tank shielding slots must be taken to ground pressure or some low pressure which will not significantly disturb the force balance of the spool. In this particular application it is shown, by way of example, that the shielding slots are grounded to the end of the spools but this would not be possible in many automatic valve types such as relief valves, reducing valves and feed valve structures. In such valve types it may be desirable that the tank shielding slots be taken out through the sleeve surrounding the spool aside of a collecting ring which is matched with a pick-up or tank slot ring. All of this can be arranged by proper design once the basic essentials are understood without departing from the spirit of the present invention.

In addition to the basic problem of spool valves with respect to their inherent gradient locking tendencies, there is the same fundamental problem involved in pintle valving of radial or axial piston pumps and motors. The problem is serious since the pintle is in a sense a spool valve very closely fitted to a rotor to provide timed valve porting to and from pistons on a high frequency timing basis. From a fluid motor point of view, where the motor is running at low speed, there is a very good possibility of reaching a speed where journal film lubrication will not support the operation between pintle and rotor. When this occurs, the static locking condition encountered in many spool valves begins to occur. For this reason, it is extremely important to be able to give static balancing design to pintles and radial piston pumps and motors.

In the case of pumps and motors, there are of course other forces besides the gradient forces that need be handled. In many cases, the pintle is a cantilever beam extending into the rotor and is required to support external forces imposed upon the rotor by the angular position of the piston driven by an eccentric means. This may not always be the case since bearings may be incorporated to handle these external forces, but the main problem is one of balancing externally imposed forces and internally induced hydraulic gradient forces. In any event, multiple quadrant balancing can be incorporated in pintle pumps to accomplish the same results as in general spool valving.

It should also be noted that in the case of pintle pumps, where there are generally larger bending moments formed, multiple quadrant balancing tends to reduce bending moments that are imposed by any balancing means. It is also possible to use direct opposed area balancing in combination with multiple quadrant balancing of the present invention to handle very high unbalanced loads.

While the form of embodiment of the present invention as herein disclosed constitutes a preferred form, it is to be understood that other forms might be adopted, all coming within the scope of claims which follow:

I claim:
1. An improved balanced hydraulic valve comprising, the combination, a housing member including a cylindrical inner surface; and a cylindrical member in said housing member including a cylindrical outer surface confronting said cylindrical inner surface, one of said members including a plurality of circumferentially spaced recesses, each of which communicates with a respective detector opening on the opposite side of said member, the area of said recesses being greater than the area of said detector openings; and one of said members including shielding openings that separate said recesses from one another and said detector openings from one another, said shielding openings communicating with a region of low pressure.

2. An improved balanced hydraulic valve comprising, in combination, a housing member including a cylindrical inner surface; and a cylindrical member in said housing member including a cylindrical outer surface confronting said cylindrical inner surface, one of said members including a plurality of circumferentially spaced recesses, each of which communicates with a respective detector opening on the opposite side of said member, the area of said recesses being greater than the area of said detector openings; and one of said members including shielding openings that separate said recesses from said detector openings and said detector openings from one another, said shielding openings communicating with a region of low pressure.

3. The hydraulic valve defined in claim 1 wherein said detector openings are in the form of arcuate slots.

4. The hydraulic valve defined in claim 2 wherein said detector openings are in the form of arcuate slots.

References Cited by the Examiner
UNITED STATES PATENTS
3,067,979  12/1962  Cox _____ 251—282

ISADOR WEIL, *Primary Examiner.*

WILLIAM F. O'DEA, *Examiner.*

J. O'NEILL, *Assistant Examiner.*